US012296458B2

(12) United States Patent
Kim

(10) Patent No.: US 12,296,458 B2
(45) Date of Patent: May 13, 2025

(54) ROBOT APPARATUS AND CONTROLLING METHOD THEREOF

(71) Applicant: SAMSUNG ELECTRONICS CO., LTD., Suwon-si (KR)

(72) Inventor: Daesoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 186 days.

(21) Appl. No.: 17/990,345

(22) Filed: Nov. 18, 2022

(65) Prior Publication Data

US 2023/0166407 A1  Jun. 1, 2023

Related U.S. Application Data

(63) Continuation of application No. PCT/KR2022/014802, filed on Sep. 30, 2022.

(30) Foreign Application Priority Data

Nov. 30, 2021 (KR) .......................... 10-2021-0168993

(51) Int. Cl.
*B25J 11/00* (2006.01)
*B25J 9/00* (2006.01)
(Continued)

(52) U.S. Cl.
CPC ......... *B25J 11/0005* (2013.01); *B25J 9/0003* (2013.01); *B25J 9/0009* (2013.01);
(Continued)

(58) Field of Classification Search
CPC .... B25J 11/0005; B25J 9/0003; B25J 9/0009; B25J 13/003; B25J 19/023; B25J 19/026
See application file for complete search history.

(56) References Cited

U.S. PATENT DOCUMENTS 6,330,837 B1   12/2001 Charles et al.
2007/0198128 A1* 8/2007 Ziegler ................. H04N 7/142
713/153
(Continued)

FOREIGN PATENT DOCUMENTS

CN   101292935 A   10/2008
CN   105476819 A    4/2016
(Continued)

OTHER PUBLICATIONS

International Search Report (PCT/ISA/210) issued Jan. 19, 2023 by the International Searching Authority in International Patent Application No. PCT/KR2022/014802.
(Continued)

*Primary Examiner* — Ian Jen
*Assistant Examiner* — Renee LaRose
(74) *Attorney, Agent, or Firm* — Sughrue Mion, PLLC

(57) ABSTRACT

A robot apparatus includes a body part; a head part rotatably connected to the body part and having three rotational degrees of freedom; a driving device including a plurality of motors configured to provide rotational force to the head part in a pitch direction, a roll direction, and a yaw direction to drive movement of the head part; a microphone sensor configured to detect a voice of a user; and a processor configured to perform a voice recognition processing on the voice detected from the microphone sensor to obtain a recognition result, determine interaction information based on the recognition result, and control the driving device to perform a rotation operation on the head part corresponding to the interaction information.

13 Claims, 15 Drawing Sheets

(51) Int. Cl.
  *B25J 13/00* (2006.01)
  *B25J 19/02* (2006.01)
(52) U.S. Cl.
  CPC ........... *B25J 13/003* (2013.01); *B25J 19/023* (2013.01); *B25J 19/026* (2013.01)

(56) References Cited

U.S. PATENT DOCUMENTS

2018/0376069 A1    12/2018  Makino
2020/0114521 A1*    4/2020  Mahoor ................. B25J 9/1697
2020/0122333 A1     4/2020  Park et al.

FOREIGN PATENT DOCUMENTS

| | | |
|---|---|---|
| CN | 207407001 U | 5/2018 |
| CN | 108647633 A | 10/2018 |
| JP | 3928041 B2 | 6/2007 |
| JP | 2019-123055 A | 7/2019 |
| JP | 2020-89932 A | 6/2020 |
| JP | 2021-8926 A | 1/2021 |
| JP | 7125083 B2 | 8/2022 |
| JP | 7345751 B2 | 9/2023 |
| KR | 10-2019-0123604 A | 11/2019 |
| WO | 2018/132363 A1 | 7/2018 |

OTHER PUBLICATIONS

Written Opinion (PCT/ISA/237) issued Jan. 19, 2023 by the International Searching Authority in International Patent Application No. PCT/KR2022/014802.
Communication dated Jan. 20, 2025, issued by the European Patent Office in European Application No. 22901545.8.

* cited by examiner

ROBOT APPARATUS AND CONTROLLING METHOD THEREOF

CROSS-REFERENCE TO RELATED APPLICATIONS

This application is a bypass continuation of International Application No. PCT/KR2022/014802, filed on Sep. 30, 2022, which is based on and claims priority to Korean Patent Application No. 10-2021-0168993, filed on Nov. 30, 2021, in the Korean Intellectual Property Office, the disclosures of which are incorporated by reference herein in their entireties.

BACKGROUND

1. Field

The disclosure relates to a robot apparatus in which a head part performs a rotating operation corresponding to interaction information determined based on a user voice and a controlling method thereof.

2. Description of Related Art

A social robot is a robot which engages and interacts with a human through social actions such as language and gestures, and more specifically, a robot that provides daily life support, emotional support, entertainment, education, guidance, and care services.

SUMMARY

Provided are a robot apparatus in which a head part performs a rotating operation corresponding to interaction information determined based on a user voice and a controlling method thereof.

According to an aspect of the disclosure, a robot apparatus includes: a body part; a head part rotatably connected to the body part and having three rotational degrees of freedom; a driving device including a plurality of motors configured to provide rotational force to the head part in a pitch direction, a roll direction, and a yaw direction to drive movement of the head part; a microphone sensor configured to detect a voice of a user; and a processor configured to perform a voice recognition processing on the voice detected from the microphone sensor to obtain a recognition result, determine interaction information based on the recognition result, and control the driving device to perform a rotation operation on the head part corresponding to the interaction information.

The processor may be further configured to control the driving device to: rotate the head part in the pitch direction to reciprocate vertically based on the interaction information being a positive response, and rotate the head part in the yaw direction to reciprocate laterally based on the interaction information being a negative response.

The processor may be further configured to control the driving device to rotate the head part in the roll direction to reciprocate laterally based on not being able to determine interaction information.

The robot apparatus may further include: a camera disposed at a surface of the head part and configured to detect a position of the user, and the processor may be further configured to control the driving device, based on an image captured by the camera, to rotate the head part so that the surface of the head part faces toward a face of the user.

The robot may further include a tilt sensor configured to detect a tilt of the head part.

The plurality of motors may include: a first motor configured to provide a rotational force to the head part in the pitch direction, a second motor configured to provide a rotational force to the head part in the roll direction, and a third motor configured to provide a rotational force to the head part in the yaw direction.

The driving device may further include: a first plate configured to be rotatable in the pitch direction and the roll direction by the first motor and the second motor, a second plate provided at a top side of the first plate, a third plate provided at a top side of the second plate, and configured to connect with the second plate and the head part, a first bearing including an outer ring contacting the first plate and an inner ring contacting the second plate, a shaft member penetrating the first plate, the second plate, and the first bearing, the shaft member including a top end connected to the third plate, and being rotatable in the yaw direction by the third motor, and a second bearing including an outer ring contacting the second plate and an inner ring contacting the shaft member.

The first plate includes a stop protrusion at a side surface, and wherein the driving device further includes a stop support having a vertically elongated slot through which the stop protrusion is inserted.

The driving device may further include: a universal joint including a first joint connected to the top end of the shaft member, a second joint connected to a bottom surface of the third plate, and a spider member rotatably connecting the first joint and the second joint with each other.

The third plate may include an insertion protrusion at a center of the bottom surface, the insertion protrusion having a non-circular cross-section shape, and the second joint may have an insertion groove through which the insertion protrusion is inserted.

The inner ring of the second bearing may include a spherical surface contacting the outer ring of the second bearing.

The driving device may include: a first link including a first end connected to the first motor and a second end connected to a first point of the first plate, a second link including a first end connected to the second motor and a second end configured connected to a second point of the first plate, and a third link including a first end connected to the third motor and a second end connected to the shaft member.

The first plate may include a stop protrusion at a side surface at an opposite side of the first point, the driving device may further include a stop support having a vertically elongated slot through which the stop protrusion is inserted, and the second point may be positioned at a same distance from the first point and the stop protrusion.

According to an aspect of the disclosure, a method of controlling a robot apparatus including a body part, a head part rotatably connected to the body part and having three rotational degrees of freedom, a driving device including a plurality of motors configured to provide a rotational force to the head part in a pitch direction, a roll direction and a yaw direction to drive movement of the head part, and a microphone sensor configured to detect a voice of a user, the method includes: performing a voice recognition processing on the voice detected by the microphone sensor to obtain a recognition result; determining interaction information based on the recognition result; and performing a rotation operation on the head part corresponding to the interaction information.

The method may further include: rotating the head part in the pitch direction to reciprocate vertically based on the interaction information being a positive response; and rotating the head part in the yaw direction to reciprocate laterally based on the interaction information being a negative response.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Embodiments described below are provided to assist in the understanding of the disclosure, and it is to be understood that, unlike the embodiments described herein, the disclosure may be variously modified and embodied. However, in describing the disclosure, in case it is determined that the detailed description of related known technologies may unnecessarily confuse the gist of the disclosure, the detailed description thereof and specific drawings will be omitted. In addition, the attached drawings may not be shown in its actual size but shown exaggerated in size of some elements to assist in the understanding of the disclosure.

Terms used in the disclosure are general terms selected considering their function herein. However, the terms may change depending on intention, legal or technical interpretation, emergence of new technologies, and the like of those skilled in the related art. In addition, there may be terms arbitrarily selected, and in this case, the meaning of the term may be interpreted as defined in the disclosure. If there is no specific definition of the term described, the term is to be understood based on the overall context of the disclosure and the technical common sense according to the related art.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

Further, because elements necessary in describing each embodiment of the disclosure are described herein, the disclosure is not necessarily limited hereto. Accordingly, some elements may be modified or omitted, and other elements may be added. In addition, the elements may be distributed and disposed in different independent devices.

Furthermore, embodiments of the disclosure have been described in detail with references to the accompanying drawings and descriptions described in the accompanying drawings, but the disclosure is not limited by the embodiments described herein.

The disclosure will be described in greater detail below with reference to the accompanied drawings.

Figure 1:
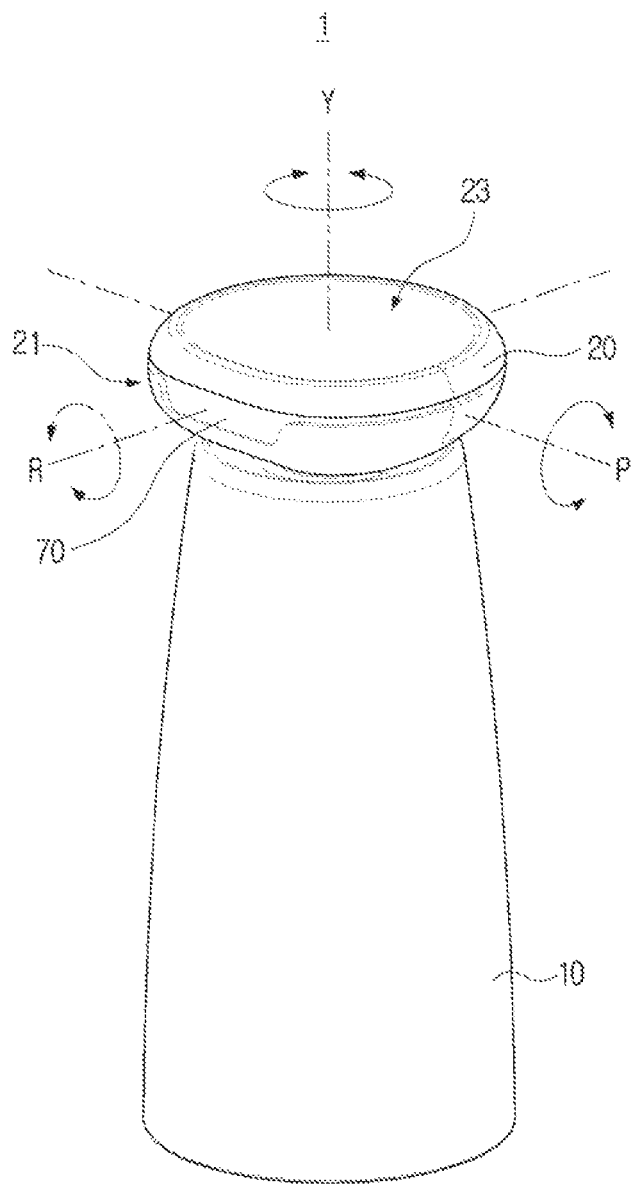
FIG. 1 is a perspective diagram illustrating a robot apparatus according to an embodiment.
Figure 2:
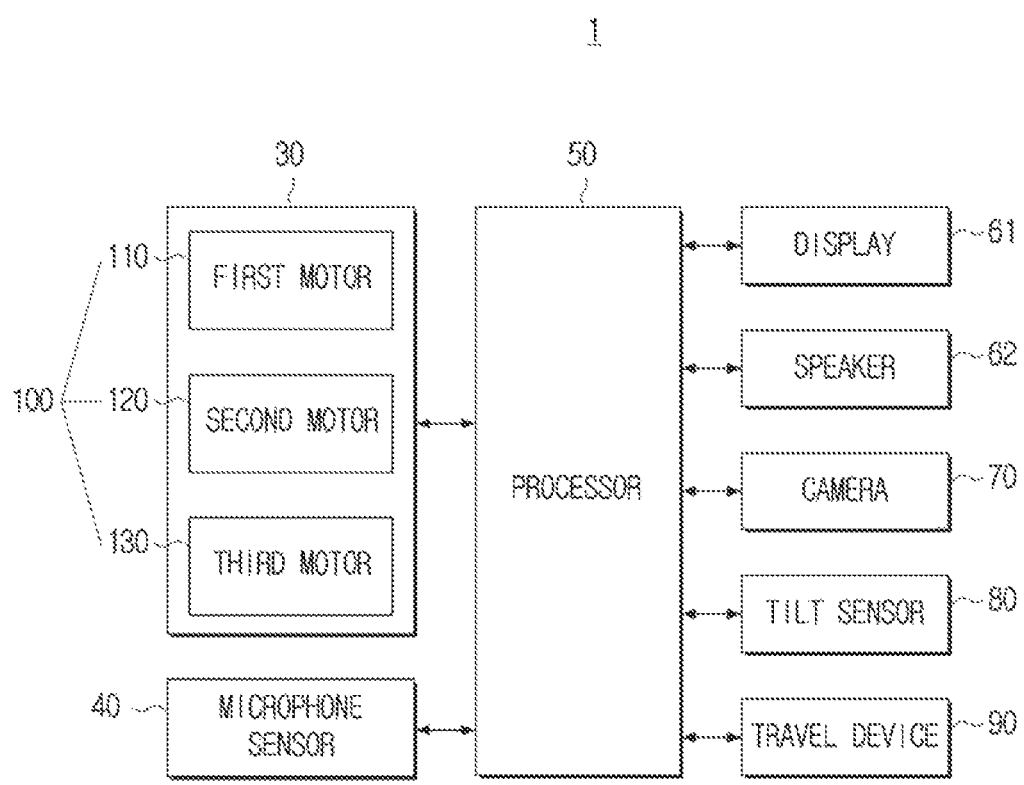
FIG. 2 is a block diagram illustrating a configuration of a robot apparatus according to an embodiment.

FIG. 1 is a perspective diagram illustrating a robot apparatus according to an embodiment. FIG. 2 is a block diagram illustrating a configuration of the robot apparatus according to an embodiment Referring to FIGS. 1 and 2, the robot apparatus 1 may include a body part 10, a head part 20, a driving device 30, a microphone sensor 40, and a processor 50.

The body part 10 may have a cylindrical shape, and the head part may be disposed at a top side of the body part 10 and have a flat top surface 23

In use, the robot apparatus 1 may transport an object when the body part 10 travels to a target point via a travel device 90 after the object is raised on top of the flat top surface 23 of the head part 20.

The head part 20 may be rotatably connected to the body part 10. Specifically, the head part 20 may be connected to the body part 10 while maintaining three rotational degrees of freedom.

The head part 20 may (i) rotate to face a front direction or a back direction based on a pitch-axis P, (ii) rotate to a left side or a right side based on a roll-axis R, and (iii) rotate based on a yaw-axis Y. Accordingly, the head part 20 may freely rotate about the three axes P, R, Y.

The driving device 30 may include a plurality of motors 100 which are configured to generate rotational force in a pitch direction (i.e., about the axis P), a roll direction (i.e., about the axis R), and a yaw direction (i.e., about the axis Y) of the head part 20 to allow movement of the head part 20 in the three rotational degrees of freedom corresponding to the axes P, R, Y.

As described above, the pitch direction, the roll direction, and the yaw direction may correspond to rotation based on the pitch-axis P, the roll-axis R, and the yaw-axis Y, respectively. The pitch-axis P may be a virtual line disposed laterally on a horizontal surface, the roll-axis R may be a virtual line disposed to the front and back on the horizontal surface, and the yaw-axis Y may be a perpendicularly disposed virtual line. The pitch-axis P, the roll-axis R, and the yaw-axis Y may be disposed orthogonally to one another.

The plurality of motors 100 may include a first motor 110, a second motor 120, and a third motor 130.

The first motor 110 may generate rotational force in the pitch direction for the head part 20. The second motor 120 may generate rotational force in the roll direction for the head part 20. The third motor 130 may generate rotational force in the yaw direction for the head part 20. Based on the three motors 110, 120, 130 being driven independently, the head part 20 may have independent movement in each of the three rotational degrees of freedom.

Figure 9:
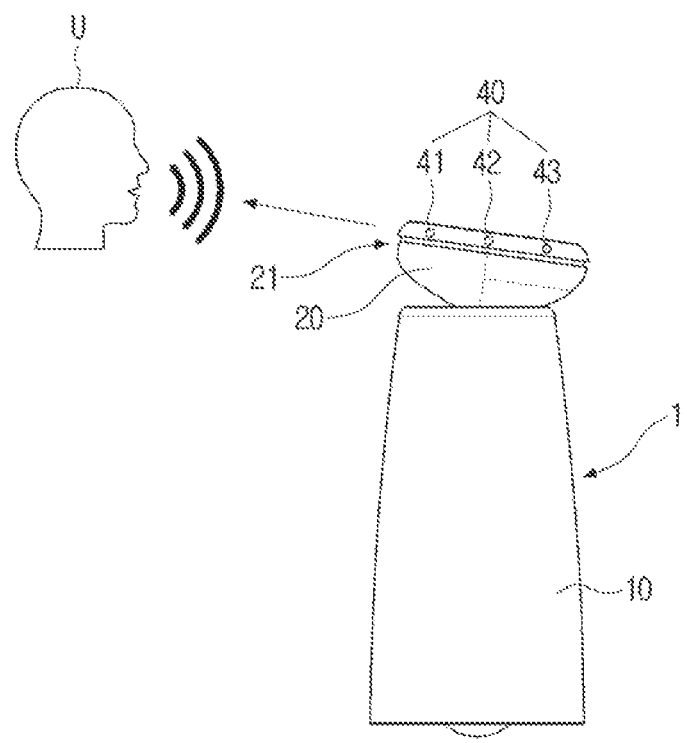
FIG. 9 is a diagram illustrating an operation of a head part rotating for one surface of the head part to face toward a user based on voice data detected by a plurality of microphone sensors.

The robot apparatus 1 may include a microphone sensor 40. The microphone sensor 40 may be configured to detect a voice of a user U. The microphone sensor 40 may be disposed in the body part 10 and/or the head part 20 (as shown in FIG. 9). The microphone sensor 40 may include a plurality of microphone sensors (e.g., microphone sensors 41, 42, 43 as shown in FIG. 9), and the plurality of microphone sensors 40 may be respectively positioned in different locations on the robot apparatus 1.

The robot apparatus 1 may include a processor 50. The processor 50 may perform a voice recognition processing on the voice of the user U sensed by the microphone sensor 40 to obtain a recognition result. For example, the processor 50 may obtain the recognition result as converted text via speech-to-text (STT) processing of a voice signal of the user U.

In some embodiments, the processor 50 may determine interaction information based on the obtained recognition result. For example, the processor 50 may determine interaction information based on the converted text derived through the STT processing. The processor 50 may determine interaction information via instructions stored in an internal memory of the robot apparatus 1 or an external server.

In some embodiments, the processor 50 may control the driving device 30 for the head part 20 to perform a rotation operation corresponding to the determined interaction information. The user U may (i) obtain information from the robot apparatus 1 by observing the head part 20 of the robot apparatus 1 performing a specific rotation operation and (ii) engage with the robot apparatus 1.

As shown in FIGS. 1, 2, 7, and 8, the robot apparatus 1 may further include a camera 70. The camera 70 may be disposed at one surface 21 of the head part 20 and capture a surrounding environment of the robot apparatus 1. The camera 70 may detect a position of the user U. An image captured through the camera 70 may be used for recognizing a face of the user U by the processor 50.

The camera 70 may be a 3D depth camera capable of measuring a distance with respect to the user U or an obstacle. The processor 50 may control a travel device 90 of the robot apparatus 1 to prevent the robot apparatus 1 from colliding with an obstacle based on the image of the surrounding environment of the robot apparatus 1 received from the camera 70.

The robot apparatus 1 according to an embodiment may further include a display 61, a speaker 62, a tilt sensor 80, and the travel device 90. Functions and a control process of the configurations described above will be described in detail below.

Figure 3:
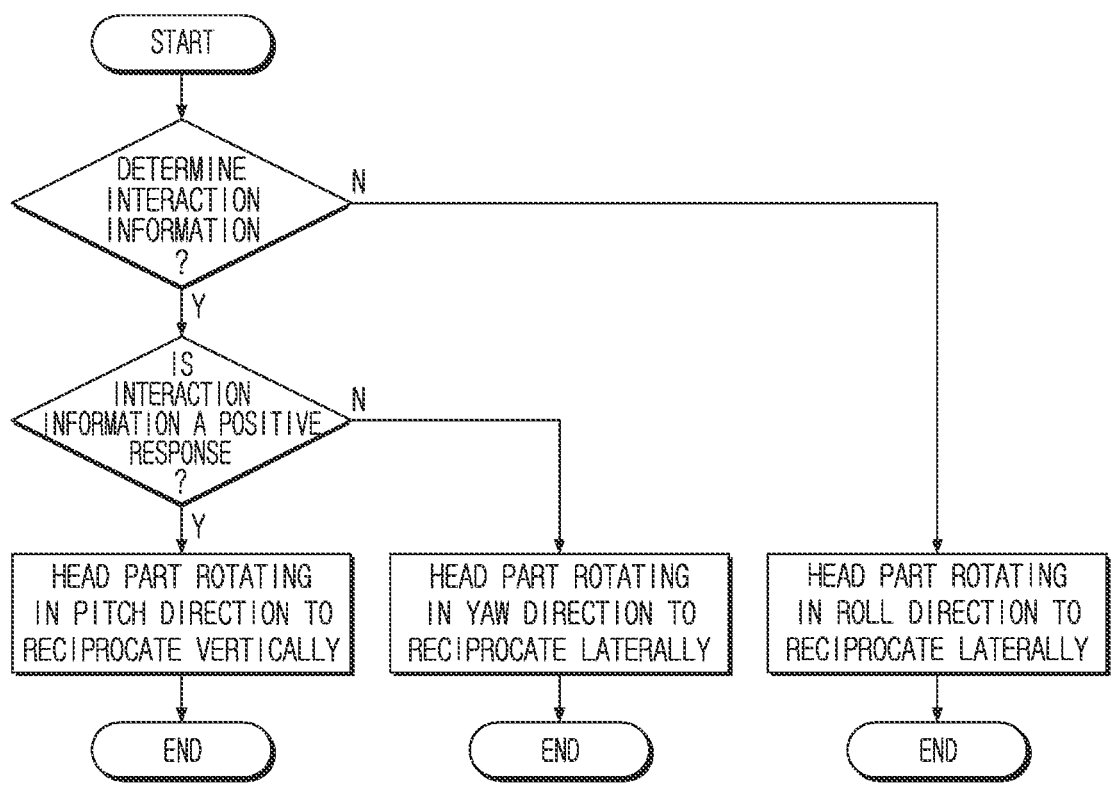
FIG. 3 is a flowchart illustrating a process in which a rotating operation of a head part corresponding to interaction information is determined.
Figure 4:
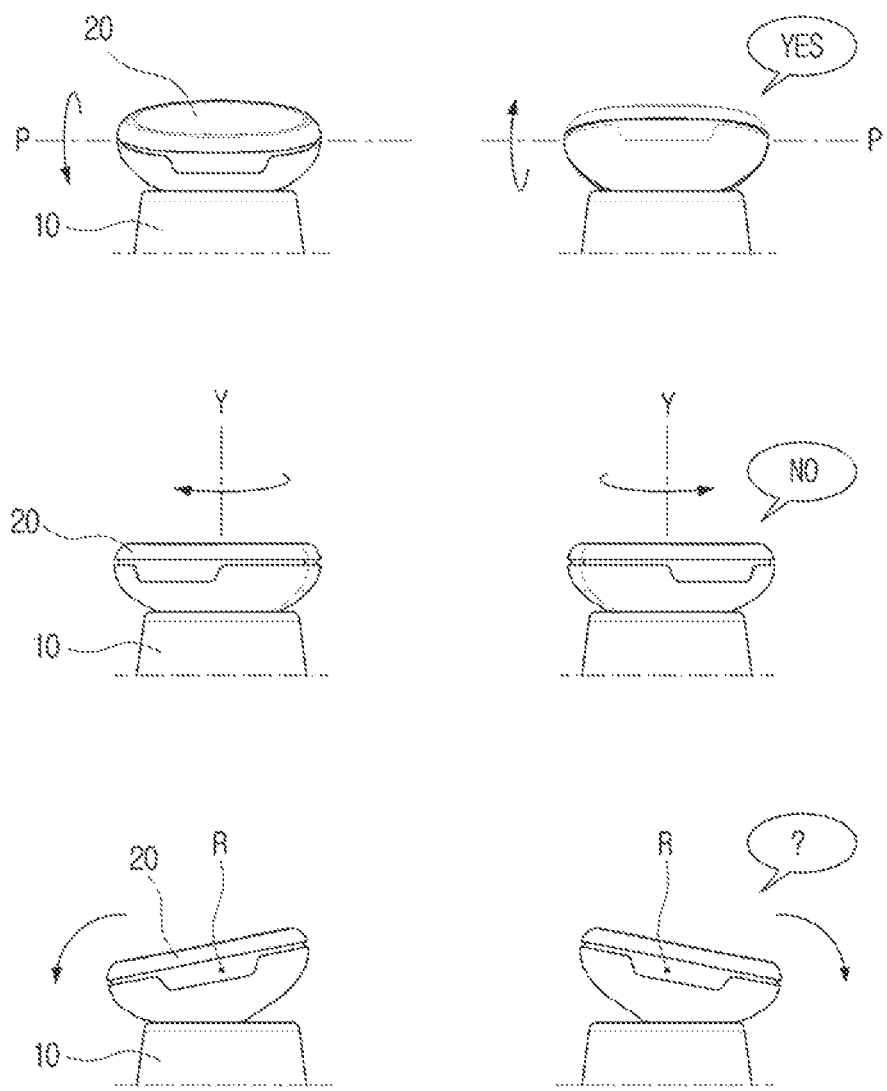
FIG. 4 is a diagram illustrating a state in which a head part performs a rotating operation corresponding to interaction information.

FIG. 3 is a flowchart illustrating a process in which a rotating operation of the head part corresponding to interaction information is determined. FIG. 4 is a diagram illustrating a state in which the head part performs the rotating operation corresponding to interaction information.

Referring to FIG. 3 and FIG. 4, the processor 50 may control the driving device 30 to rotate the head part 20 in the pitch direction to reciprocate vertically if the determined interaction information is a positive response. The head part 20 rotating in the pitch direction to reciprocate vertically may be a representation that may be perceived by the user as head nodding.

For example, if the interaction information is determined to be a positive response, it may be the recognition result being accurately obtained by the processor 50 performing voice recognition processing on the voice of the user U or responding as "YES" to a question or command of the user U, but embodiments are not limited thereto.

Accordingly, the user U may recognize that the robot apparatus 1 is responding positively by observing the head part 20 rotating in the pitch direction to reciprocate vertically after speaking to the robot apparatus 1.

The processor 50 may control the driving device 30 to rotate the head part 20 in the yaw direction to reciprocate laterally if the determined interaction information is a negative response. The head part 20 rotating in the yaw direction to reciprocate laterally may be a representation that may be perceived by the user U as head shaking.

For example, if the interaction information is determined to be a negative response, it may be the processor 50 responding as "NO" to a question or command of the user U, but embodiments are not limited thereto.

Accordingly, the user U may recognize that the robot apparatus 1 is responding negatively by observing the head part 20 rotating in the yaw direction to reciprocate laterally after speaking to the robot apparatus 1.

If the processor 50 is not able to determine the interaction information based on the obtained recognition result, the driving device 30 may be controlled to rotate the head part 20 in the roll direction to reciprocate laterally. The head part 20 rotating in the roll direction to reciprocate laterally may be a representation that may be perceived by the user U as head tilting.

For example, if the interaction information cannot be determined, it may be the recognition result not being accurately obtained by the processor 50 performing voice recognition processing on the voice of the user U or not being able to determine a response to a question of the user U, but embodiments are not limited thereto.

Accordingly, the user U may recognize that the robot apparatus 1 has not been able to recognized or understand the voice or not determined a response to the question by observing the head part 20 rotating in the roll direction to reciprocate laterally after speaking to the robot apparatus 1.

Figure 5:
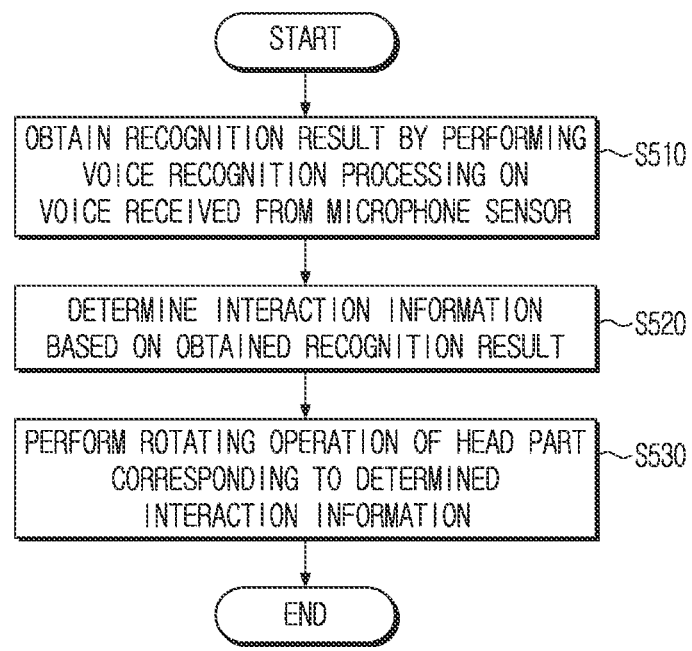
FIG. 5 is a flowchart illustrating a controlling method of a robot apparatus according to an embodiment.

FIG. 5 is a flowchart illustrating a controlling method of a robot apparatus according to an embodiment.

Referring to FIG. 5, the controlling method of the robot apparatus 1 according to an embodiment may include obtaining the recognition result by performing voice recognition processing on the voice received from the microphone sensor 40 (S510).

The controlling method of the robot apparatus 1 may include determining interaction information based on the obtained recognition result (S520).

The controlling method of the robot apparatus 1 may include the head part 20 performing a rotating operation corresponding to the determined interaction information (S530).

In addition, the controlling method of the robot apparatus 1 may further include the head part 20 rotating in the pitch direction to reciprocate vertically if the determined interaction information is a positive response.

In addition, the controlling method of the robot apparatus 1 may further include the head part 20 rotating in the yaw direction to reciprocate laterally if the determined interaction information is a negative response.

In addition, the controlling method of the robot apparatus 1 may further include the head part 20 rotating in the roll direction to reciprocate laterally if the interaction information cannot be determined based on the obtained recognition result.

Accordingly, the user U may recognize a success or failure of voice recognition, and a content of the response to a question or command of the robot apparatus 1 by observing the head part 20 performing a specific rotating operation after speaking to the robot apparatus 1.

Figure 6:
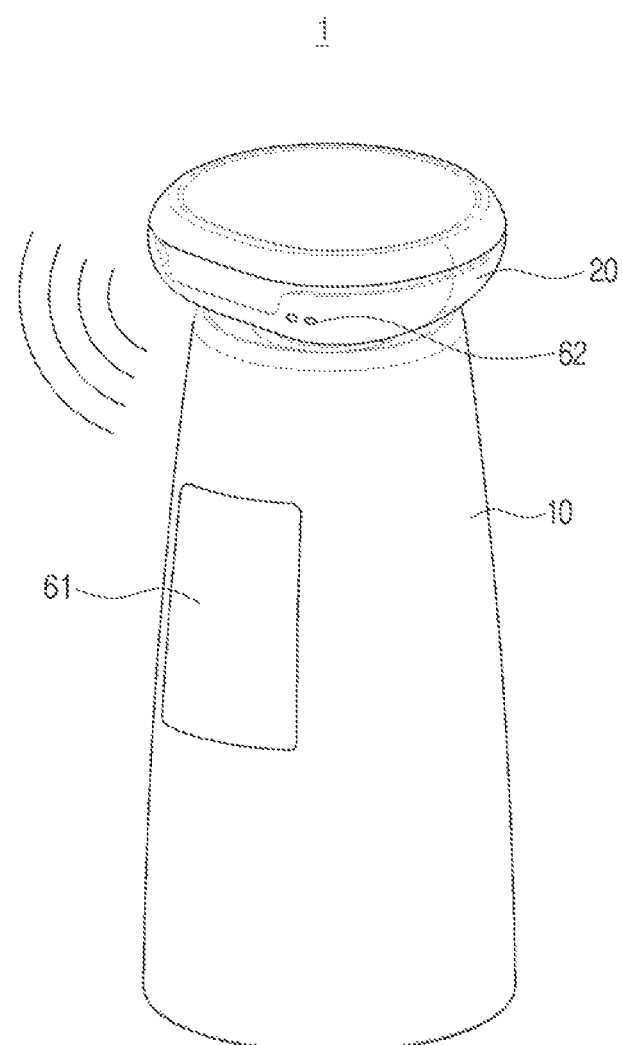
FIG. 6 is a diagram illustrating an operation of at least one from among a display and a speaker providing content corresponding to interaction information.

FIG. 6 is a diagram illustrating an operation a display and/or a speaker providing content corresponding to interaction information.

Referring to FIG. 6, the robot apparatus 1 may include the display 61 and/or the speaker 62.

The display 61 may be disposed at a surface of the body part 10, but the position is not limited thereto. For example, the display 61 may alternatively be disposed on the head part 20, or as a plurality of displays 61 disposed on one or both of the body part 10 and the head part 20.

The speaker 62 may be disposed at a surface of the head part 20, but the position is not limited thereto, For example, the speaker 62 may be disposed on the body part 10, or as a plurality of speakers 62 disposed on one or both of the body part 10 and the head part 20.

The processor 50 may control the display 61 and/or the speaker 62 to present content corresponding to the determined interaction information to be provided to the user U.

For example, for a question asked by the user U for which the interaction information is not determined as a positive response or a negative response, at least one of the display 61 and the speaker 62 may provide the user U with content corresponding to the asked question such as weather, traffic information, movies, music, images, and phone calls.

Figure 7:
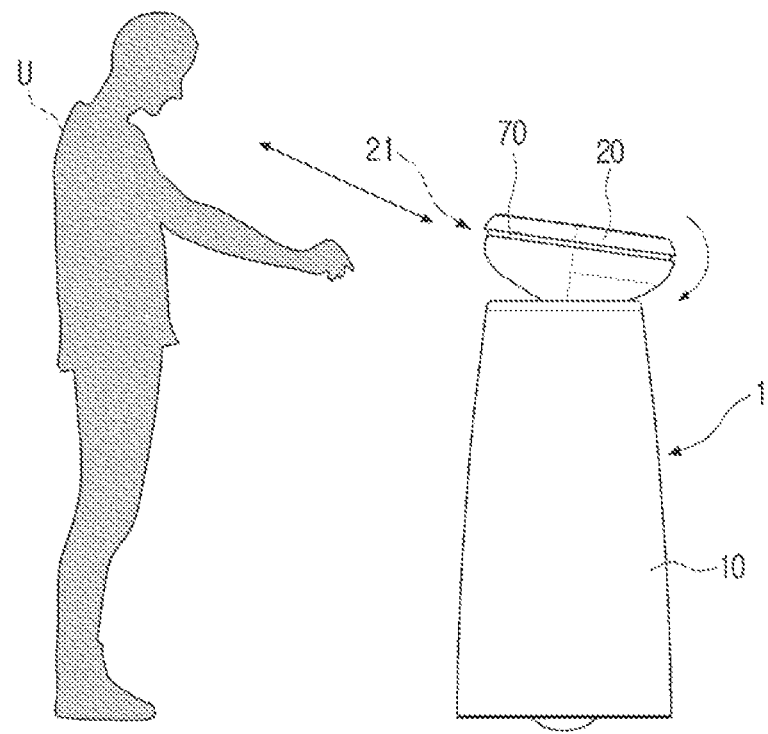
FIG. 7 is a diagram illustrating an operation of a head part rotating for a camera to face toward a face of a user.
Figure 7:
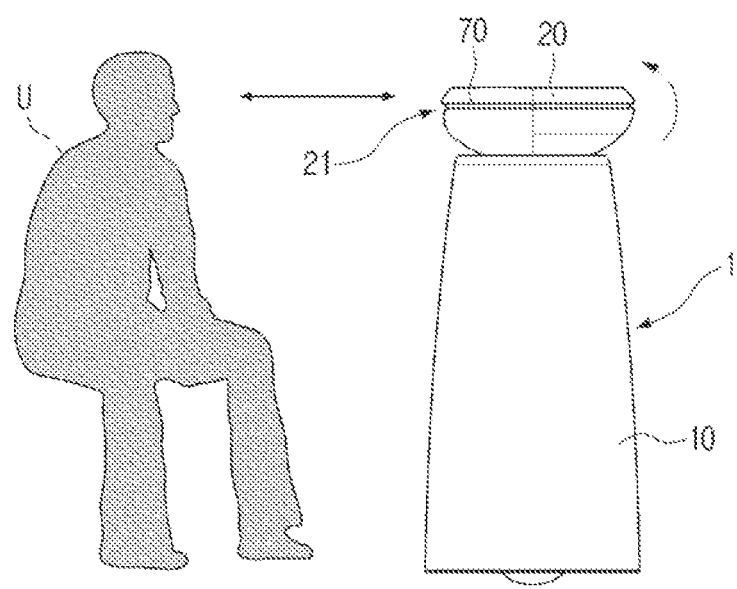
Figure 8:
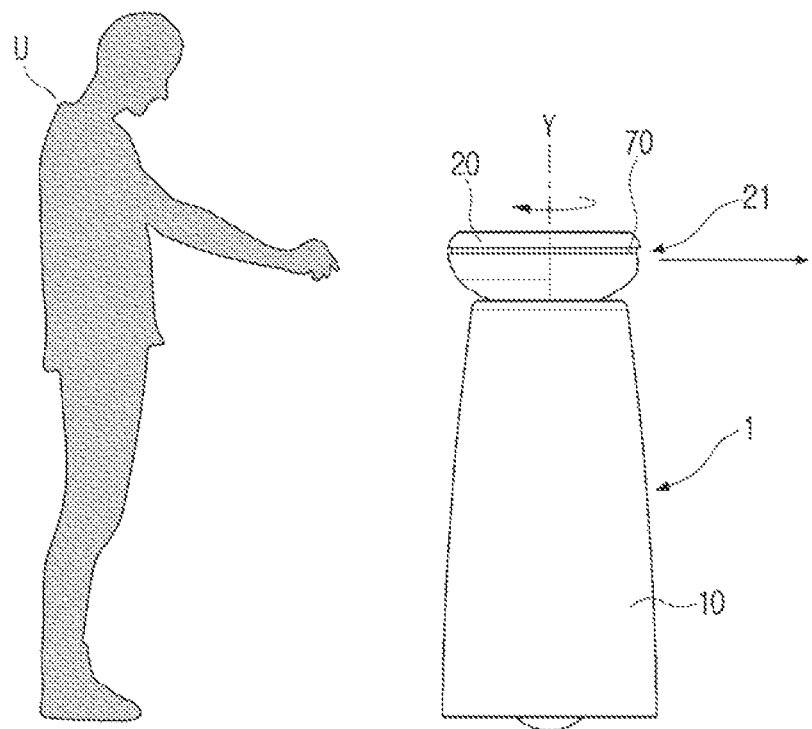
FIG. 8 is a diagram illustrating an operation of a head part rotating in a yaw direction until a position of a user is detected by a camera.
Figure 8:
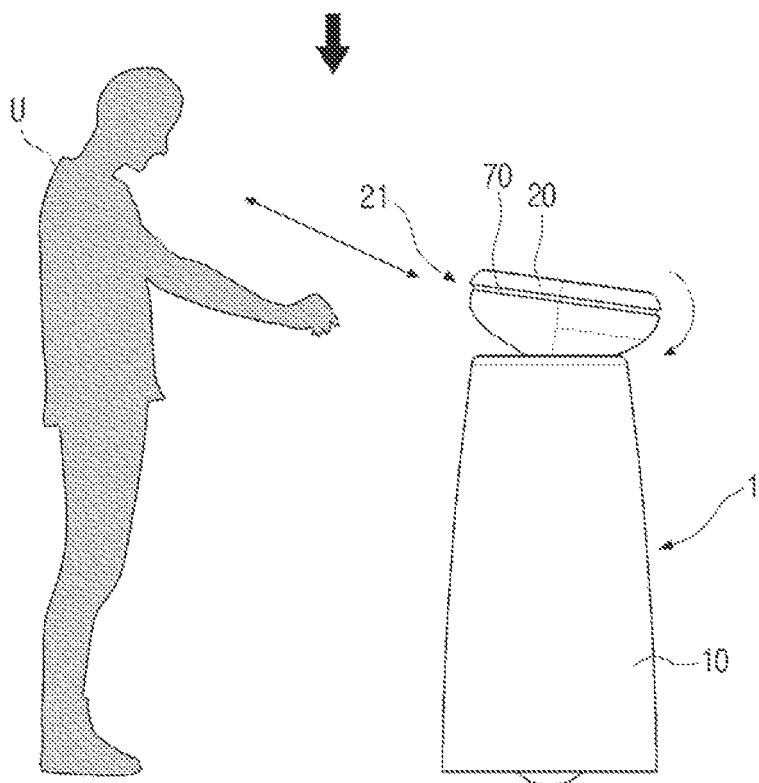

FIG. 7 is a diagram illustrating an operation of the head part rotating for the camera to face toward the face of the user U. FIG. 8 is a diagram illustrating an operation of the head part rotating in the yaw direction until the position of the user U is detected by the camera.

Referring to FIG. 7, the camera 70 of the robot apparatus 1 is disposed at one surface of the head part 20 and may detect a position of the user U.

In response to detecting the position of the user U, the processor 50 may control, based on the image received from the camera 70, the driving device 30 such that the surface 21 of the head part 20 faces toward the face of the user U in such a way that the user U may perceive that the head part 20 of the robot apparatus 1 is making "eye contact" with the user U. For example, the processor 50 may control the driving part 30 to rotate the head part 20 until the face or eyes of the user U is positioned at a center of the image received by the camera 70.

For example, the processor 50 may (i) calculate an eye level of the user U based on the image received from the camera 70, (ii) determine a rotation angle of the head part 20 (e.g., determine a pitch angle, a roll angle, and a yaw angle of the head part 20) for the camera 70 to face toward the eyes of the user U, and (iii) control the driving device 30 to rotate the head part 20 by one or more determined rotation angles.

Based on the head part 20 rotating by the one or more determined rotation angles and the camera 70 being disposed to face the face or eyes of the user U, the user U may engage with the robot apparatus 1.

Referring to FIG. 8, the processor 50 may be configured to control the driving device 30 to rotate the head part 20 in the yaw direction until the position of the user U is detected by the camera 70.

For example, the processor 50 may control, based on determining that there is no user U in the image received from the camera 70, the driving device 30 for the head part 20 to rotate in the yaw direction until a body or face of the user U is positioned in the image received from the camera 70.

Then, after the body or face of the user U is detected, the processor 50 may control the driving device 30 to rotate the head part 20 until the face or eyes of the user U is positioned at the center of the image received from the camera 70. Before the one surface 21 of the head part 20 faces toward the face or eyes of the user U, the robot apparatus 1 may easily find the position of the user U according to a pre-operation of the head part 20 rotating in the yaw direction.

FIG. 9 is a diagram illustrating an operation of the head part rotating for the one surface of the head part to face toward the user U based on voice data detected by the plurality of microphone sensors.

Referring to FIG. 9, the microphone sensor 40 may include the plurality of microphone sensors 41, 42, and 43. The plurality of microphone sensors 41, 42, and 43 may be disposed at different positions from one another such that an intensity of voice data received from each of the microphone sensors 41, 42, and 43 based on the spoken voice of the user U at which the voice data is received may be different from one another.

The processor 50 may control the driving device 30 such that the surface 21 of the head part 20 faces toward the user U based on a plurality of voice data received from the plurality of microphone sensors 40, respectively.

For example, the processor 50 may obtain a direction from which the voice of the user U generated by comparing the times at which the voice data is received from the first microphone sensor 41, the second microphone sensor 42, and the third microphone sensor 43, respectively.

For example, the processor 50 may determine, based on a time at which the first microphone sensor 41 receives voice data (e.g., t1) being earlier than a time at which the second microphone sensor 42 receives voice data (e.g., t2), that the user U is positioned closer to the first microphone sensor 41 than the second microphone sensor 42. In addition, the processor 50 may determine that the user U is positioned farther from the robot apparatus 1 as a time difference of t1 and t2 becomes smaller.

The processor 50 may control the driving device 30 so that the surface 21 of the head part 20 faces toward the user U or a sound source (e.g., a mouth of the user U) determined through the above-described calculation process.

Based on the head part 20 rotating in the direction towards the source of the voice of the user U obtained by the processor 50, and the camera 70 being disposed to face the face or eyes of the user U, the user U may engage with the robot apparatus 1.

Figure 10:
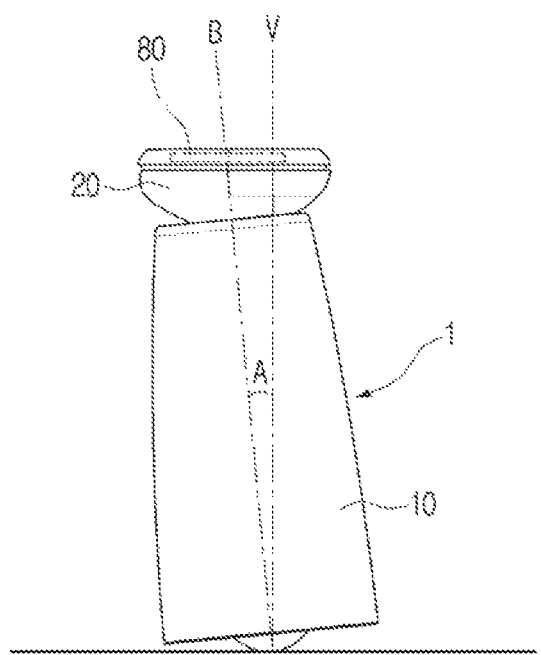
FIG. 10 is a diagram illustrating a head part being controlled to maintain horizontality when a robot apparatus is travelling.

FIG. 10 is a diagram illustrating a head part being controlled to maintain horizontality when the robot apparatus is travelling.

Referring to FIG. 10, the tilt sensor 80 may be configured to detect a tilt of the head part 20.

The tilt sensor 80 may be an inertial measurement unit (IMU) sensor or a three axes acceleration sensor. The tilt sensor 80 may detect the rotation angle of the head part 20 by being disposed inside of the head part 20.

The rotation angle of the head part 20 detected by the tilt sensor 80 may be a degree to which the head part 20 is tilted based on the three axes P, R, Y. For example, the tilt sensor 80 may detect the degree to which the head part 20 is tilted based on the pitch-axis P, the roll-axis R, and/or the yaw-axis Y.

As described above, the robot apparatus 1 may further include the travel device 90 which may be configured to move the body part 10. The travel device 90 may include one or more wheels connected to a bottom end of the body part 10 and one or more motors which may be configured to rotate the one or more wheels.

The processor 50 may control the driving device 30 to maintain the head part 20 horizontally based on the tilt of the head part 20 detected through the tilt sensor 80 when the body part 10 is moved by the travel device 90.

In order for the robot apparatus 1 to not fall due to inertia when traveling while accelerating and decelerating, self-balancing may be implemented as the body part 10 is tilted toward the front direction or the back direction.

Accordingly, the head part 20 may be horizontally maintained according to a feedback control process of the tilt sensor 80 without being tilted toward the front direction or the back direction together with the body part 10.

For example, the tilt sensor 80 may detect an absolute gravity acceleration of the head part 20, and the processor 50 may control the driving device 30 such that the head part 20 is to be maintained absolutely horizontal based on a gravity direction.

For example, an additional tilt sensor may detect the tilt of the body part 10, and the processor 50 may control the driving device 30 such that the head part 20 is tilted in an opposite direction with the body part 10 according to the detected tilt of the body part 10 to be maintained relatively horizontally to the body part 10.

For example, based on a body-axis B of the body part 10 being detected as tilted by a specific angle A with respect to a vertical-axis V by the additional tilt sensor, the processor 50 may control the driving device 30 such that the head part 20 is titled by the specific angle A in the opposite direction with the body part 10 and the opposite direction with the body-axis B to be maintained relatively horizontally to the body part 10.

Accordingly, even if the body part 10 is tilted toward the object placed on top of the top surface 23 of the head part 20 may be stably transported. In addition, even if self-balancing control is performed as the body part 10 is tilted to the front direction or the back direction, because the head part 20 is horizontally maintained, the robot apparatus 1 that accelerates and decelerates may provide a sense of stability to the user U.

Figure 11:
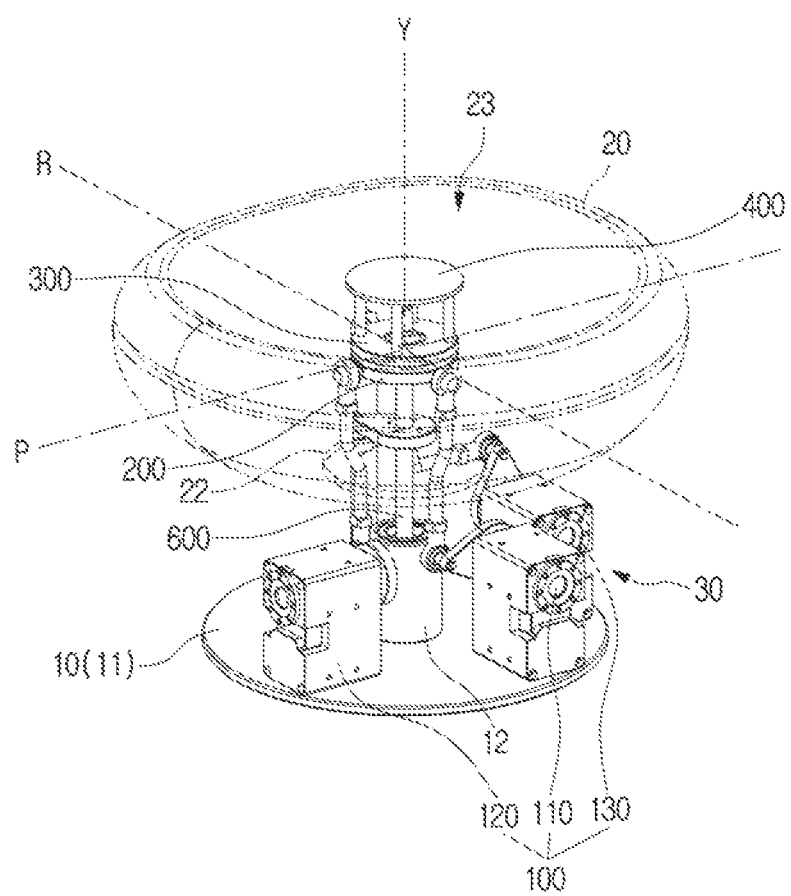
FIG. 11 is a perspective diagram illustrating a structure of a driving device connected to a head part.
Figure 12:
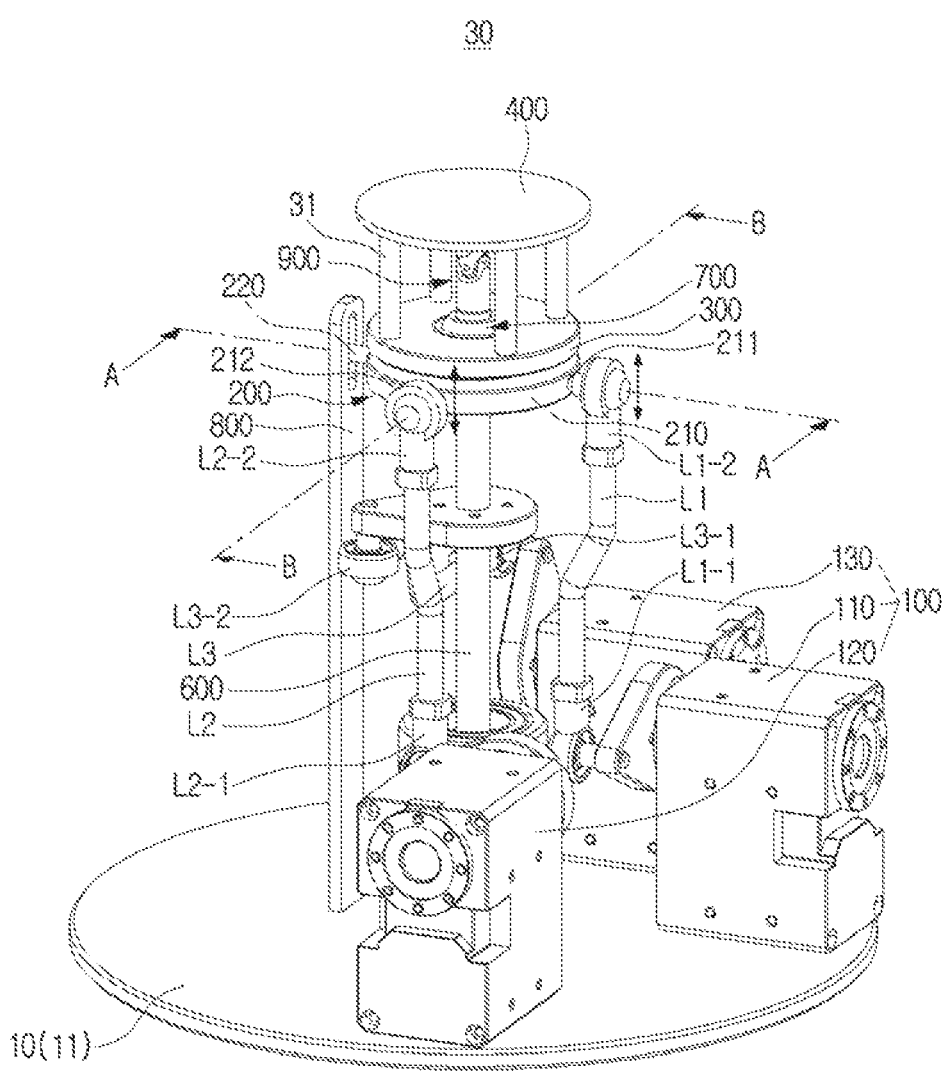
FIG. 12 is a perspective diagram of a driving device according to an embodiment.
Figure 13:
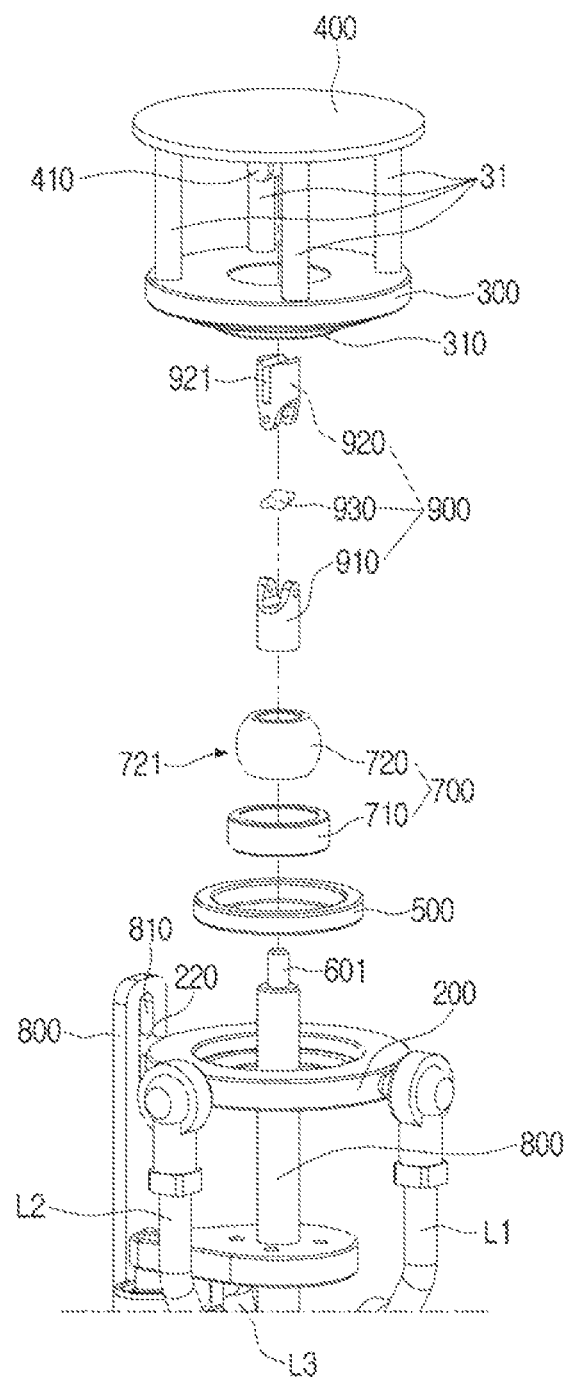
FIG. 13 is an exploded perspective diagram of the driving device of FIG. 12.
Figure 14:
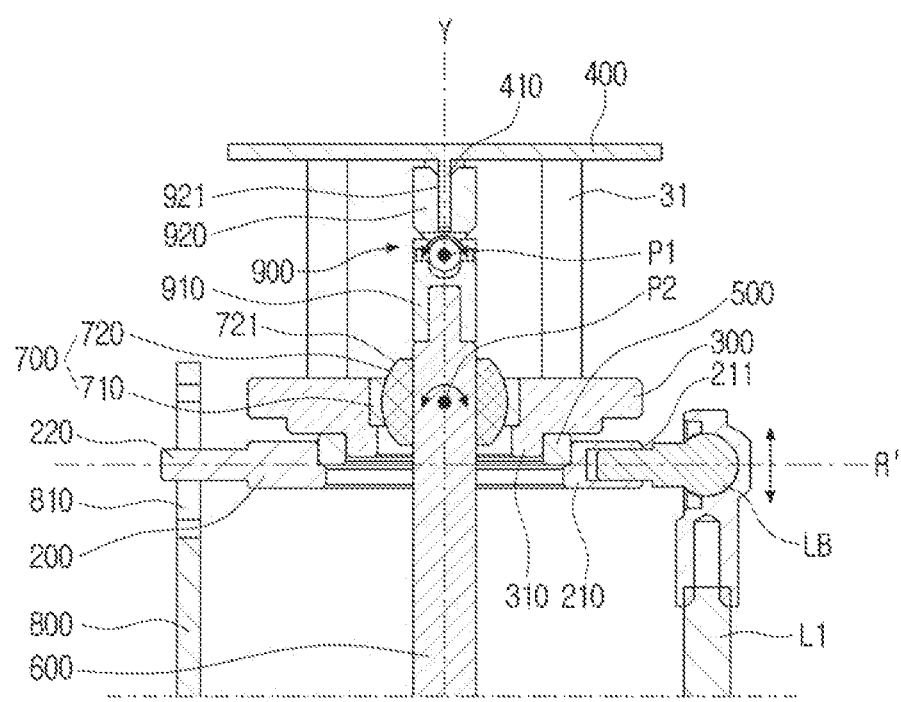
FIG. 14 is a cross-sectional diagram of the driving device of FIG. 12 taken along line A-A.
Figure 15:
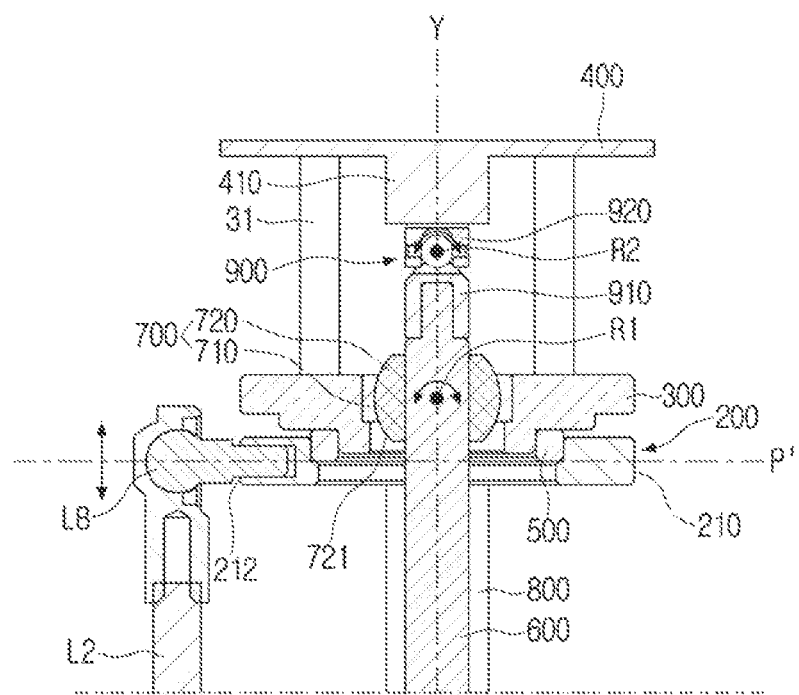
FIG. 15 is a cross-sectional diagram of the driving device of FIG. 12 taken along line B-B.

FIG. 11 is a perspective diagram illustrating a structure of the driving device connected to the head part. FIG. 12 is a perspective diagram of the driving device according to an embodiment. FIG. 13 is an exploded perspective diagram of the driving device of FIG. 12. FIG. 14 is a cross-sectional diagram of the driving device of FIG. 12 taken along line A-A. FIG. 15 is a cross-sectional diagram of the driving device of FIG. 12 taken along line B-B.

Referring to FIG. 11 to FIG. 15, the driving device 30 may further include a first plate 200, a second plate 300, a third plate 400, a first bearing 500, a shaft member 600, and a second bearing 700.

The first plate 200 may rotate in the pitch direction and the roll direction by the first motor 110 and the second motor 120. The first plate 200 may have a shape of a ring with a penetrated center.

The second plate may be disposed at the top side of the first plate 200. The second plate 300 may also have a shape of a ring with a penetrated center like the first plate 200.

The third plate 400 may be disposed at the top side of the second plate 300, and may be connected with the second plate 300 and the head part 20. The first plate 200, the second plate 300, and the third plate 400 may be disposed parallel to one another.

The driving device 30 may further include a plurality of pillar members 31. The plurality of pillar members 31 may include a top end connected to a bottom surface of the third plate 400 and a bottom end connected to a top surface of the second plate 300.

The top surface of the third plate 400 may be connected with an inner surface of the head part 20. The top surface of the third plate 400 may be connected to an opposite surface of the top surface 23 of the head part 20. The second plate 300, the third plate 400, and the head part 20 may be connected integrally and rotate together.

The first bearing 500 may include an outer ring contacting with the first plate 200 and an inner ring contacting with the second plate 300. The first bearing 500 may be a ball bearing, but the type is not limited thereto.

The first bearing 500 may be supported by an inside surface of the first plate 200. Based on the first bearing 500 being disposed between the first plate 200 and the second plate 300, the second plate 300, the third plate 400, and the head part 20 may rotate in the yaw direction even if the first plate 200 is stopped.

If the first plate 200 is tilted in the pitch direction and/or the roll direction by the first and second motors 110 and 120, the second plate 300 which is supported by the first plate 200 may also be tilted in the same direction as with the first plate 200, and accordingly, the third plate 400 and the head part 20 may also be tilted in the pitch direction and/or the roll direction.

The shaft member 600 may penetrate the first plate 200, the second plate 300, and the first bearing 500, include a top end 601 which connects to the third plate 400, and rotate in the yaw direction by the third motor 130.

The shaft member 600 may be supported by a base 11 of the body part 10 to be rotatable in the yaw direction. The base 11 may be horizontally disposed inside the body part 10. The base 11 may have a rough circular disk shape, but the shape is not limited thereto.

For example, the shaft member 600 may be supported by a bearing member 12 installed at the base 11 to be rotatable. The bearing member 12 may have a cylindrical shape, and may be fixed perpendicular to the top surface of the base 11. The outer ring of the bearing member 12 may be integrally connected with and fixed to the base 11, and the inner ring of the bearing member 12 may be contacted with the shaft member 600. Accordingly, the shaft member 600 may stably rotate in the yaw direction while maintaining a perpendicular orientation by the base 11 and the bearing member 12.

When the shaft member 600 rotates in the yaw direction by the third motor 130, the third page 400 connected to the shaft member 600 may rotate, and the second plate 300 may also rotate in the yaw direction together with the third plate 400.

The shaft member 600 may be disposed to be parallel with the yaw-axis Y so as to be continuously perpendicular without being tilted in a specific direction.

The second bearing 700 may include an outer ring 710 which contacts with the second plate 300 and an inner ring 720 which contacts with the shaft member 600. Even if the shaft member 600 is not tilted and is disposed to be parallel with the yaw-axis Y, the second plate 300 may be tilted in the pitch direction and/or the roll direction. Accordingly, the third plate 400 and the head part 20 may also be tilted in the pitch direction and/or the roll direction.

The first plate 200 may include a stop protrusion 220 formed at a side surface 210. The stop protrusion 220 may be protruded and formed from the side surface 210 of the first plate 200 toward an outer side in a radial direction.

The driving device 30 may further include a stop support 800 which includes a slot 810 through which the stop protrusion 220 is inserted and is formed to be vertically long. The stop support 800 may be disposed perpendicularly to be parallel with the shaft member 600.

The slot 810 of the stop support 800 may be perpendicularly formed and have a width corresponding to the stop protrusion 220 in a horizontal direction. Based on the stop protrusion 220 being inserted in the slot 810 of the stop support 800, the first plate 200 may not rotate in the yaw direction even if the second plate 300 is rotated. Accordingly, the first plate 200 may stably support the second plate 300 which rotates in the yaw direction, and the second plate 300 may rotate in the yaw direction without deviating from a designated position.

Based on the first plate 200 tilting in the pitch direction by the first motor 110, the second plate 300 may also be tilted in the pitch direction together with the first plate 200. At this time, because the stop protrusion 220 may vertically move in the slot 880 which is perpendicularly formed, the first plate 200 may be tilted in the pitch direction freely without interference from the stop protrusion 220 and the stop support 800.

Based on the first plate 200 being tilted in the roll direction by the second motor 120, the second plate 300 may also be tilted in the roll direction together with the first plate 200. At this time, because the stop protrusion 220 and the slot 810 are disposed on a roll-axis R' of the first plate 200, the stop protrusion 220 may rotate in the roll direction in its place. That is, the first plate 200 may be tilted in the roll direction freely without interference from the stop protrusion 220 and the stop support 800.

The driving device 30 may further include a universal joint 900. The universal joint 900 may include a first joint 910, a second joint 920, and a spider member 930.

The first joint 910 may be connected to the top end 601 of the shaft member 600. The second joint 920 may be connected to the bottom surface of the third plate 400. The spider member 930 may connect the first joint 910 and the second joint 920 to be rotatable with each other.

The first joint 910 and the second joint 920 may include a yoke part which is orthogonal to each other, and the spider member 930 may include a cross axis which connects the yoke part of the first and second joints 910 and 920.

The second joint 920 may receive only the rotation force of the yaw direction from the first joint 910, and may not receive the rotational force in the pitch direction and the roll direction.

If the shaft member 600 rotates in the yaw direction by the third motor 130, the first joint 910, the second joint 920, and the third plate 400 may also rotate in the yaw direction.

The third plate 400 may be formed at the center of the bottom surface and include an insertion protrusion 410 having a non-circular cross-section shape. The insertion protrusion 410 may be disposed on the yaw-axis Y of the third plate 400. The insertion protrusion 410 may have a rough rectangular parallelepiped shape.

The second joint 920 of the universal joint 900 may include an insertion groove 921 to which the insertion protrusion 410 of the third plate 400 is inserted. The insertion groove 921 may be in a shape engaging with the insertion protrusion 410.

Because the insertion protrusion 410 has a non-circular cross-section shape, the rotational force to the yaw direction of the second joint 920 may be transferred to the insertion protrusion 410 of the third plate 400. Accordingly, when the second joint 920 is rotated, the third plate 400 and the head part 20 may also rotate in the yaw direction.

The inner ring 720 of the second bearing 700 may include a spherical surface 721 which contacts with the outer ring 710 of the second bearing 700. The inner ring 720 of the second bearing 700 may have a shape of a sphere which is penetrated by the shaft member 600.

The second plate 300 and the outer ring 710 of the second bearing 700 may be tilted in the pitch direction and/or the roll direction along the spherical surface 721 of the inner ring 720 of the second bearing 700. That is, the inner ring 720 of the second bearing 700 may define a first pitch-axis P1 and a first roll-axis R1 of the second plate 300. The first pitch-axis P1 and the first roll-axis R1 may be orthogonal to each other and pass through a curvature center of the spherical surface 721 of the inner ring 720 of the second bearing 700.

Accordingly, based on the first plate 200 rotating in the pitch direction or the roll direction by the first and second motors 110 and 120, the shaft member 600 and the first joint 910 may be stopped, and the second plate 300 and the third plate 400 may rotate about the first pitch-axis P1 or the first roll-axis R1 defined by the inner ring 720 of the second bearing 700.

Based on the third plate 400 rotating about the first pitch-axis P1 or the first roll-axis R1, the second joint 920 may be pushed by the insertion protrusion 410 and rotate about a second pitch-axis P2 or a second roll-axis R2 defined by the spider member 930. The second pitch-axis P2 and the second roll-axis R2 may be disposed at a side higher than the first pitch-axis P1 and the first roll-axis R1.

Because the insertion protrusion 410 and the second joint 920 have rotation axes at different positions from each other, a portion of a section of the insertion protrusion 410 may slide from the insertion groove 921 and deviate to the top side, and may compensate for a length difference.

The driving device 30 may further include a first link L1, a second link L2, and a third link L3.

The first link L1 may include a first end L1-1 which connects to the first motor 110 and a second end L1-2 which connects to a first point 211 of the first plate 200. The second link L2 may include a first end L2-1 which connects to the second motor 120 and a second end L2-2 which connects to a second point 212 of the first plate 200. The third link L3 may include a first end L3-1 which connects to the third motor 130 and a second end L3-2 which connects to the shaft member 600.

The first link L1 and the second link L2 may include a link ball LB which connects to the first plate 200. A first end of the link ball LB may be inserted in and fixed to the first plate 200 and a second end may have a spherical shape. The second end of the link ball LB may be encased by the first and second links L1 and L2 to be rotatable.

Referring to FIG. 14, based on the first link L1 ascending by the first motor 110, the first plate 200 may rotate in an anti-clockwise direction, and based on the first link L1 descending by the first motor 110, the first plate 200 may rotate in a clockwise direction.

Referring to FIG. 15, based on the second link L2 ascending by the second motor 120, the first plate 200 may rotate in the clockwise direction, and based on the second link L2 descending by the second motor 120, the first plate 200 may rotate in the counter-clockwise direction.

The first plate 200 may include the stop protrusion 220 formed at an opposite side of the first point 211 from among the side surface 210. The second point 212 may be positioned at a same distance from the first point 211 and the stop protrusion 220 from among the side surface 210 of the first plate 200.

The first point 211 may be disposed on the roll-axis R' of the stop protrusion 220 and the first plate 200, and the second point 212 may be disposed on a pitch-axis P' of the first plate 200. The roll-axis R' of the first plate 200 and the pitch-axis P' of the first plate 200 may be disposed orthogonal to each other.

The first to third motors 110, 120, and 130 may be accommodated inside of the body part 10. The first to third motors 110, 120, and 130 may be supported by the base 11 of the body part 10.

The first link L1 may have a bent shape such that the first end L1-1 is disposed to be closer to the shaft member 600 than the second end L1-2. The second link L2 may have a bent shape such that the first end L2-1 is disposed to be closer to the shaft member 600 than the second end L2-2.

The first and second links L1 and L2 may penetrate a through-hole 22 formed at the bottom surface of the head part 20 and be connected to the first plate 200.

By accommodating the first to third motors 110, 120, and 130 which are relatively big in volume and weight in the body part 10, utilization of space of the head part 20 may be increased because electronic components such as LEDs and PCBs may be mounted inside the head part 20.

In addition, because the head part 20 which is a part to be operated is lightened in weight and minimized in volume, the head part 20 may be more efficiently rotated by minimizing capacities of the first to third motors 110, 120, and 130.

While example embodiments of the disclosure have described with reference to the drawings, it will be understood that the example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A robot apparatus comprising:
a body part;
a head part rotatably connected to the body part and having three rotational degrees of freedom;
a driving device comprising a plurality of motors configured to provide rotational force to the head part in a pitch direction, a roll direction, and a yaw direction to drive movement of the head part;
a microphone sensor configured to detect a voice of a user; and
a processor configured to:
perform a voice recognition processing on the voice detected from the microphone sensor to obtain a recognition result,
determine interaction information based on the recognition result, and
control the driving device to perform a rotation operation on the head part corresponding to the interaction information,
wherein the plurality of motors comprises:
a first motor configured to provide a rotational force to the head part in the pitch direction;
a second motor configured to provide a rotational force to the head part in the roll direction; and
a third motor configured to provide a rotational force to the head part in the yaw direction, and
wherein the driving device further comprises:
a first plate configured to be rotatable in the pitch direction and the roll direction by the first motor and the second motor;
a second plate provided at a top side of the first plate;
a third plate provided at a top side of the second plate, and configured to connect with the second plate and the head part;
a first bearing comprising an outer ring contacting the first plate and an inner ring contacting the second plate;
a shaft member penetrating the first plate, the second plate, and the first bearing, the shaft member comprising a top end connected to the third plate, and being rotatable in the yaw direction by the third motor; and
a second bearing comprising an outer ring contacting the second plate and an inner ring contacting the shaft member.

2. The robot apparatus of claim 1, wherein the processor is further configured to control the driving device to:
rotate the head part in the pitch direction to reciprocate vertically based on the interaction information being a positive response, and
rotate the head part in the yaw direction to reciprocate laterally based on the interaction information being a negative response.

3. The robot apparatus of claim 1, wherein the processor is further configured to control the driving device to rotate the head part in the roll direction to reciprocate laterally based on not being able to determine interaction information.

4. The robot apparatus of claim 1, further comprising:
a camera disposed at a surface of the head part and configured to detect a position of the user,
wherein the processor is further configured to control the driving device, based on an image captured by the camera, to rotate the head part so that the surface of the head part faces toward a face of the user.

5. The robot apparatus of claim 1, further comprising:
a tilt sensor configured to detect a tilt of the head part.

6. The robot apparatus of claim 1,
wherein the first plate comprises a stop protrusion at a side surface, and
wherein the driving device further comprises a stop support having a vertically elongated slot through which the stop protrusion is inserted.

7. The robot apparatus of claim 1, wherein the driving device further comprises:
a universal joint comprising:
a first joint connected to the top end of the shaft member,
a second joint connected to a bottom surface of the third plate, and
a spider member rotatably connecting the first joint and the second joint with each other.

8. The robot apparatus of claim 7,
wherein the third plate comprises an insertion protrusion at a center of the bottom surface, the insertion protrusion having a non-circular cross-section shape, and wherein the second joint having an insertion groove through which the insertion protrusion is inserted.

9. The robot apparatus of claim 1, wherein the inner ring of the second bearing comprises a spherical surface contacting the outer ring of the second bearing.

10. The robot apparatus of claim 1, wherein the driving device further comprises:
- a first link comprising a first end connected to the first motor and a second end connected to a first point of the first plate,
- a second link comprising a first end connected to the second motor and a second end configured connected to a second point of the first plate, and
- a third link comprising a first end connected to the third motor and a second end connected to the shaft member.

11. The robot apparatus of claim 10,
wherein the first plate comprises a stop protrusion at a side surface at an opposite side of the first point,
wherein the driving device further comprises a stop support having a vertically elongated slot through which the stop protrusion is inserted, and
wherein the second point is positioned at a same distance from the first point and the stop protrusion.

12. A method of controlling a robot apparatus comprising a body part, a head part rotatably connected to the body part and having three rotational degrees of freedom, a driving device comprising a plurality of motors configured to provide a rotational force to the head part in a pitch direction, a roll direction and a yaw direction to drive movement of the head part, and a microphone sensor configured to detect a voice of a user, the method comprising:
- performing a voice recognition processing on the voice detected by the microphone sensor of the robot apparatus to obtain a recognition result;
- determining interaction information based on the recognition result; and
- performing a rotation operation on the head part corresponding to the interaction information, wherein the rotation operation comprises at least one of:
- controlling one of a first motor of the plurality of motors and a second motor of the plurality of motors to cause a first plate of the driving device to rotate in the pitch direction or the roll direction; and
- controlling a third motor of the plurality of motors to cause an end of a shaft member to rotate in the yaw direction, wherein a second plate of the robot apparatus is between and is connected to the first plate and a third plate of the robot apparatus,
wherein the third plate is connected to the head part and the end of the shaft member,
wherein a first bearing of the robot apparatus comprises an outer ring contacting the first plate and an inner ring contacting the second plate,
wherein the shaft member penetrates the first plate, the second plate, and the first bearing, and
wherein a second bearing of the robot apparatus comprises an outer ring contacting the second plate and inner ring contacting the shaft member.

13. The method of claim 12, further comprising:
rotating the head part in the pitch direction to reciprocate vertically based on the interaction information being a positive response; and
rotating the head part in the yaw direction to reciprocate laterally based on the interaction information being a negative response.

* * * * *